United States Patent
Spiegelman et al.

(10) Patent No.: US 7,625,015 B2
(45) Date of Patent: Dec. 1, 2009

(54) FLUID CONNECTOR

(75) Inventors: Jeffrey J. Spiegelman, Del Mar, CA (US); Richard Dean Blethen, Vista, CA (US)

(73) Assignee: Rasirc, San Diego, CA (US)

( * ) Notice: Subject to any disclaimer, the term of this patent is extended or adjusted under 35 U.S.C. 154(b) by 0 days.

(21) Appl. No.: 12/198,764

(22) Filed: Aug. 26, 2008

(65) Prior Publication Data
US 2009/0015009 A1      Jan. 15, 2009

Related U.S. Application Data

(63) Continuation of application No. PCT/US2007/006777, filed on Mar. 19, 2007.

(60) Provisional application No. 60/784,381, filed on Mar. 20, 2006.

(51) Int. Cl.
*F16L 39/00* (2006.01)

(52) U.S. Cl. .................... 285/124.3; 285/382

(58) Field of Classification Search .............. 285/124.3, 285/124.2, 124.1, 124.4, 256, 382
See application file for complete search history.

(56) References Cited

U.S. PATENT DOCUMENTS

| | | | | |
|---|---|---|---|---|
| 2,936,791 A | * | 5/1960 | Farrar | 285/114 |
| 3,326,279 A | * | 6/1967 | Eisberg et al. | 165/133 |
| 3,363,680 A | * | 1/1968 | Baker | 165/158 |
| 3,426,841 A | * | 2/1969 | Johnson | 165/178 |
| 3,526,275 A | * | 9/1970 | Eirikis et al. | 165/158 |
| 3,806,167 A | * | 4/1974 | Notari et al. | 285/39 |
| 3,820,828 A | * | 6/1974 | Fiddler | 285/124.3 |
| 3,948,315 A | * | 4/1976 | Powell | 165/70 |
| 4,480,683 A | * | 11/1984 | Wollbeck et al. | 165/70 |
| 4,848,448 A | * | 7/1989 | Kaarre | 165/158 |
| 4,954,206 A | | 9/1990 | Voss et al. | |
| 4,990,296 A | | 2/1991 | Pitolaj | |
| 4,995,646 A | | 2/1991 | Johnston et al. | |
| 5,053,130 A | * | 10/1991 | Raff et al. | 210/321.79 |
| 5,102,533 A | * | 4/1992 | Oshiyama | 210/85 |
| 5,458,989 A | | 10/1995 | Dodge | |
| 5,746,856 A | | 5/1998 | Hendershot et al. | |
| 5,934,320 A | | 8/1999 | O'Reilly et al. | |
| 6,007,932 A | | 12/1999 | Steyn | |
| 6,153,083 A | | 11/2000 | Hofmann et al. | |
| 6,390,127 B2 | * | 5/2002 | Schick | 137/625.11 |
| 6,585,296 B1 | * | 7/2003 | Picha et al. | 285/124.1 |
| 6,761,166 B2 | | 7/2004 | Ahlmen et al. | |
| 7,014,222 B1 | * | 3/2006 | Poppe | 285/332.1 |
| 7,472,928 B2 | * | 1/2009 | Salven et al. | 285/124.3 |
| 2004/0091389 A1 | | 5/2004 | Malkin et al. | |
| 2005/0120882 A1 | | 6/2005 | Gerner et al. | |

* cited by examiner

*Primary Examiner*—David E Bochna
(74) *Attorney, Agent, or Firm*—Knobbe, Martens, Olson & Bear LLP

(57) ABSTRACT

A fluid connector is provided that allows for the simultaneous sealing of multiple tubes within a single outer shell when an external radial compressive force is applied.

40 Claims, 2 Drawing Sheets

FLUID CONNECTOR

CROSS-REFERENCE TO RELATED APPLICATIONS

This application is a continuation, under 35 U.S.C. § 120, of International Patent Application No. PCT/US2007/006777, filed on Mar. 19, 2007 under the Patent Cooperation Treaty (PCT), which was published by the International Bureau in English on Sep. 27, 2007, which designates the United States and claims the benefit of U.S. Provisional Application No. Ser. No. 60/784,381, filed on Mar. 20, 2006, the disclosures of which are hereby expressly incorporated by reference in their entirety and are hereby expressly made a portion of this application.

FIELD OF THE INVENTION

A fluid connector is provided that allows for the simultaneous sealing of multiple tubes within a single outer shell when an external radial compressive force is applied.

BACKGROUND OF THE INVENTION

High purity steam is used in many applications in current advanced technology processes, including processes employed in semiconductor manufacturing, production of medical gases, and fuel cell technology. Because high purity steam introduces minimal impurities, such as toxic waste byproducts, into a process, it can be used, e.g., for the oxidation of silicon, in the production of thin gate oxides (e.g., in the electronics and semiconductor industries), and in ultrahigh purity cleaning processes.

In the pharmaceutical and biotechnology industries, high purity steam is used for sterilization, or can be condensed to yield high purity water. Although generally more expensive than standard de-ionization processes, the production of liquid water from high purity steam can yield a product having reduced amounts of, e.g., prions, viruses, allergens, proteins, bacteria, and other biologically active macromolecules or substances present in biological systems that may not be effectively removed by standard water de-ionization processes. Additionally water containing substantially reduced levels of inorganic substances, such as borates and silicates that commonly pass through de-ionized water systems, or metallic substances such as iron, nickel, chrome, copper, and other toxic metals characteristic of water produced from metal stills, can be obtained from ultrapure steam.

Typically, steam for technological and industrial applications is produced by simply boiling de-ionized water or by reacting gaseous hydrogen and oxygen to yield water vapor. In the latter case, the production of pure steam is practically impossible due to the presence of residual oxygen and/or hydrogen remaining in the product water vapor. Removing these components often requires additional expensive and complex separation processes. Additionally, high concentrations of gaseous hydrogen are often required for the synthesis reaction with oxygen, which is conducted at high temperatures well above the explosive limit of hydrogen (approximately 8% at a pressure of approximately 100 kPa). Steam synthesis processes operated under such conditions can present dangerous safety problems if not properly conducted.

The simple boiling of high purity de-ionized water to yield steam can avoid the problems and dangers inherent in the direct reaction of hydrogen and oxygen to yield steam. However, removing dissolved gases can be difficult and often requires multiple boiling/condensation cycles in a hermetically sealed environment, which can be expensive. Moreover, aerosols containing materials that are not normally volatile, such as salts or metals, can be produced during the boiling process. When steam containing such aerosols is condensed at the point of use, these impurities may be incorporated into the condensate and can add unwanted impurities to the liquid water, and therefore, higher costs due to subsequent process steps required for the removal of the impurities. Because ultrapure water itself is very corrosive, whatever material is used to construct the boiler (e.g., quartz, stainless steel, glass, etc.) can be dissolved into the steam and then entrained in aerosols.

SUMMARY OF THE INVENTION

A fluid connector for use in apparatus for generating high purity steam that does not introduce impurities into the steam, and that provides a durable seal that can withstand conditions of steam production is desirable. Also desirable is a fitting that can be used with fragile membrane lumens to provide a rugged seal without damage to the lumens. The devices and methods of the preferred embodiments can achieve one or more of these goals.

Accordingly, in a first aspect a connector is provided, the connector comprising a shell and a means for applying an external compressive radial force by a swaging operation; at least one lumen; and a sealant having a cold flow property such that, in use, when an external compressive radial force is generated by the swaging operation, the force is transferred between the shell and the lumen to form a resealable seal by cold flow of the sealant.

In an embodiment of the first aspect, means for applying an external compressive radial force by a swaging operation comprises compression of an external ferrule over the shell.

In an embodiment of the first aspect, the lumen further comprises a backing ferrule.

In an embodiment of the first aspect, the lumen further comprises a backing ferrule comprises a material selected from the group consisting of stainless steel, metal, ceramic, glass, and plastic.

In an embodiment of the first aspect, the lumen comprises a perfluorinated ionomer.

In an embodiment of the first aspect, the perfluorinated ionomer is selected from the group consisting of perfluorosulfonic acid/tetrafluoroethylene copolymers and perfluorocarboxylic acid/tetrafluoroethylene copolymer.

In an embodiment of the first aspect, the lumen comprises a material selected from the group consisting of metal, glass, quartz, plastic, and ceramic.

In an embodiment of the first aspect, the metal is selected from the group consisting of stainless steel, nickel, and copper.

In an embodiment of the first aspect, the sealant comprises a plastic, e.g., acetal homopolymer, nylon, or a fluoropolymer. The fluoropolymer can be selected from the group consisting of a polymer of tetrafluoroethylene and perfluorovinylether, polytetrafluoroethylene, fluorinated ethylene propylene copolymer, a modified fluoroalkoxy polymer, polyvinylidene fluoride, and a perfluoroalkoxy polymer.

In an embodiment of the first aspect, the connector comprises a plurality of lumens, wherein the lumens are arrayed radially.

In an embodiment of the first aspect, the connector comprises a plurality of lumens, wherein the lumens are arrayed axially.

In an embodiment of the first aspect, the connector comprises a plurality of lumens, wherein the lumens are arrayed concentrically.

In an embodiment of the first aspect, the shell comprises a material selected from the group consisting of stainless steel, steel, aluminum, copper, and thermoset plastic.

In an embodiment of the first aspect, the lumen is a thin tubular membrane having a wall thickness of from about 0.0005 inches to about 0.020 inches.

In an embodiment of the first aspect, the lumen has a diameter of from about 0.005 inches to about 0.5 inches.

In an embodiment of the first aspect, the lumen has a diameter of from about 0.0150 inches to about 0.025 inches.

In an embodiment of the first aspect, the lumen has a ratio of wall thickness to diameter of from about 1:5 to about 1:100.

In an embodiment of the first aspect, the lumen has a ratio of wall thickness to diameter of from about 1:10 to about 1:25.

In an embodiment of the first aspect, the connector is configured to operate at a pressure of from about 1 torr to about 3000 psi.

In an embodiment of the first aspect, the connector is configured to operate at a pressure of from about 1 torr to about 100 psi.

In an embodiment of the first aspect, the connector is configured to operate at a pressure of from about 760 torr to about 100 psi.

In an embodiment of the first aspect, the connector has a diameter of from about 0.25 inches to about 12 inches.

In an embodiment of the first aspect, the connector has a diameter of from about 0.25 inches to about 2 inches.

In an embodiment of the first aspect, the connector comprises from 2 to 50 lumens.

In an embodiment of the first aspect, less than about 50% of a cross-sectional area of the seal is occupied by lumens.

In an embodiment of the first aspect, the connector is a steam transfer connector.

In an embodiment of the first aspect, the connector is used in a tube in shell heat exchanger.

In an embodiment of the first aspect, the connector is used in a tube in shell humidifier.

In an embodiment of the first aspect, the connector is used in a tube in shell gas contactor.

In a second aspect, a connector is provided comprising a shell and a means for applying an external compressive radial force by a swaging operation; a plurality of tubular channels, wherein each tubular channel is in communication with a fluid path; and a sealant having a cold flow property such that, in use, when an external compressive radial force is generated by the swaging operation, the force is transferred between the shell and the tubular channels to form a resealable seal by cold flow of the sealant, whereby the plurality of fluid paths are joined by the connector to form a single fluid path.

In an embodiment of the second aspect, the tubular channels are thin wall membranes.

In an embodiment of the second aspect, the tubular channels are hollow fibers.

In an embodiment of the second aspect, the tubular channels each have a backing ferrule.

In an embodiment of the second aspect, means for applying an external compressive radial force by a swaging operation comprises compression of an external ferrule over the shell.

In an embodiment of the second aspect, the tubular channels further comprises a backing ferrule comprises a material selected from the group consisting of stainless steel, metal, ceramic, glass, and plastic.

In an embodiment of the second aspect, the tubular channels comprises a perfluorinated ionomer.

In an embodiment of the second aspect, the perfluorinated ionomer is selected from the group consisting of perfluorosulfonic acid/tetrafluoroethylene copolymers and perfluorocarboxylic acid/tetrafluoroethylene copolymer.

In an embodiment of the second aspect, the tubular channels comprises a material selected from the group consisting of metal, glass, quartz, plastic, and ceramic.

In an embodiment of the second aspect, the metal is selected from the group consisting of stainless steel, nickel, and copper.

In an embodiment of the second aspect, the sealant comprises a plastic, e.g., acetal homopolymer, nylon, or a fluoropolymer. The fluoropolymer can be selected from the group consisting of a polymer of tetrafluoroethylene and perfluorovinylether, polytetrafluoroethylene, fluorinated ethylene propylene copolymer, a modified fluoroalkoxy polymer, polyvinylidene fluoride, and a perfluoroalkoxy polymer.

In an embodiment of the second aspect, the connector comprises a plurality of tubular channels arrayed radially.

In an embodiment of the second aspect, the connector comprises a plurality of tubular channels arrayed axially.

In an embodiment of the second aspect, the connector comprises a plurality of tubular channels arrayed concentrically.

In an embodiment of the second aspect, the shell comprises a material selected from the group consisting of stainless steel, steel, aluminum, copper, and thermoset plastic.

In an embodiment of the second aspect, the tubular channels are thin tubular membrane having a wall thickness of from about 0.0005 inches to about 0.020 inches.

In an embodiment of the second aspect, the tubular channels have a diameter of from about 0.005 inches to about 0.5 inches.

In an embodiment of the second aspect, the tubular channels have a diameter of from about 0.0150 inches to about 0.025 inches.

In an embodiment of the second aspect, the tubular channels have a ratio of wall thickness to diameter of from about 1:5 to about 1:100.

In an embodiment of the second aspect, the tubular channels have a ratio of wall thickness to diameter of from about 1:10 to about 1:25.

In an embodiment of the second aspect, the connector is configured to operate at a pressure of from about 1 torr to about 3000 psi.

In an embodiment of the second aspect, the connector is configured to operate at a pressure of from about 1 torr to about 100 psi.

In an embodiment of the second aspect, the connector is configured to operate at a pressure of from about 760 torr to about 100 psi.

In an embodiment of the second aspect, the connector has a diameter of from about 0.25 inches to about 12 inches.

In an embodiment of the second aspect, the connector has a diameter of from about 0.25 inches to about 2 inches.

In an embodiment of the second aspect, the connector comprises from 2 to 50 tubular channels.

In an embodiment of the second aspect, less than about 50% of a cross-sectional area of the seal is occupied by tubular channels.

In an embodiment of the second aspect, the connector is a steam transfer connector.

In an embodiment of the second aspect, the connector is used in a tube in shell heat exchanger.

In an embodiment of the second aspect, the connector is used in a tube in shell humidifier.

In an embodiment of the second aspect, the connector is used in a tube in shell gas contactor.

DETAILED DESCRIPTION OF THE PREFERRED EMBODIMENT

Figure 1:
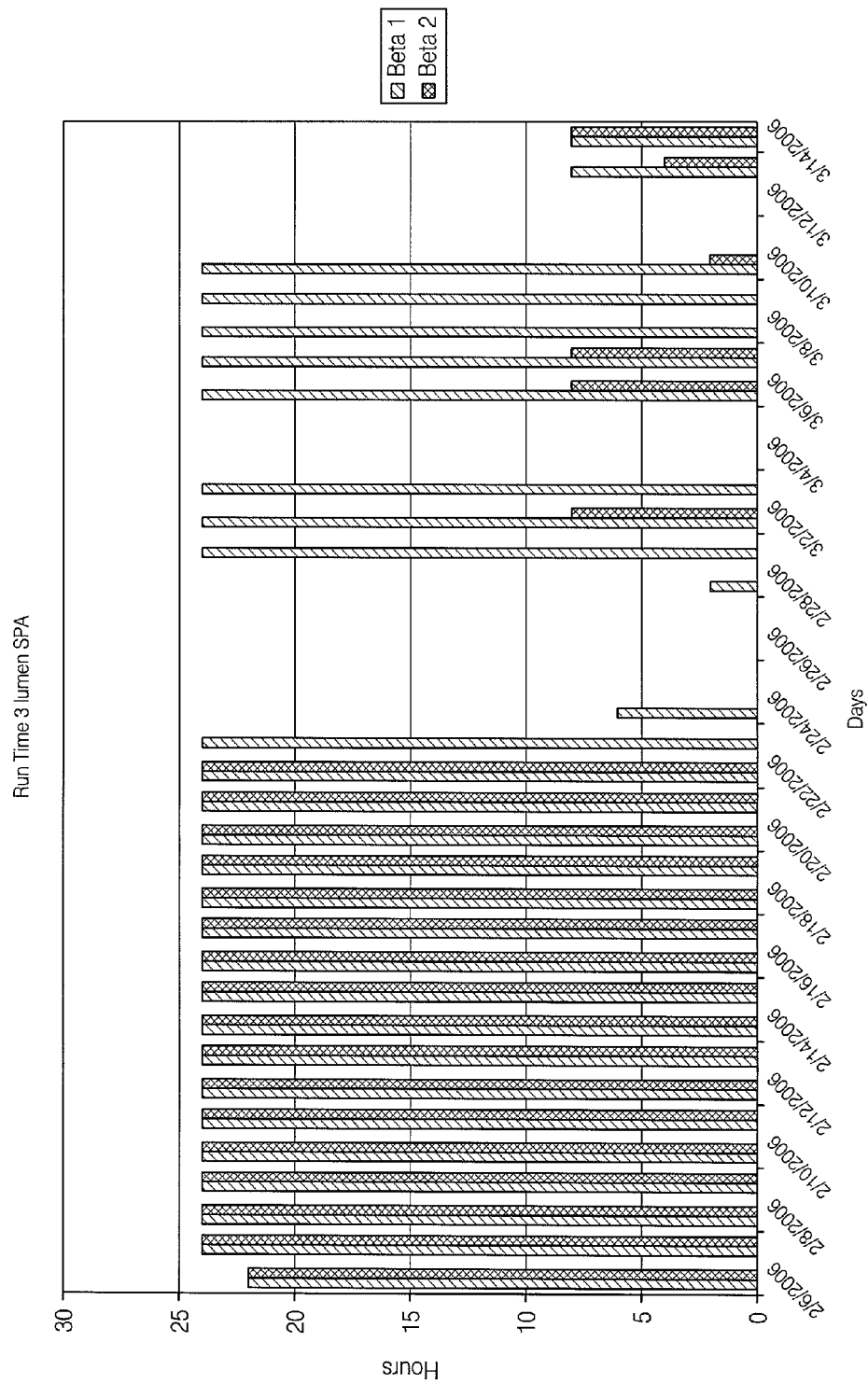
FIG. 1 provides a graph depicting thermal cycling test results for two connectors.
Figure 2:
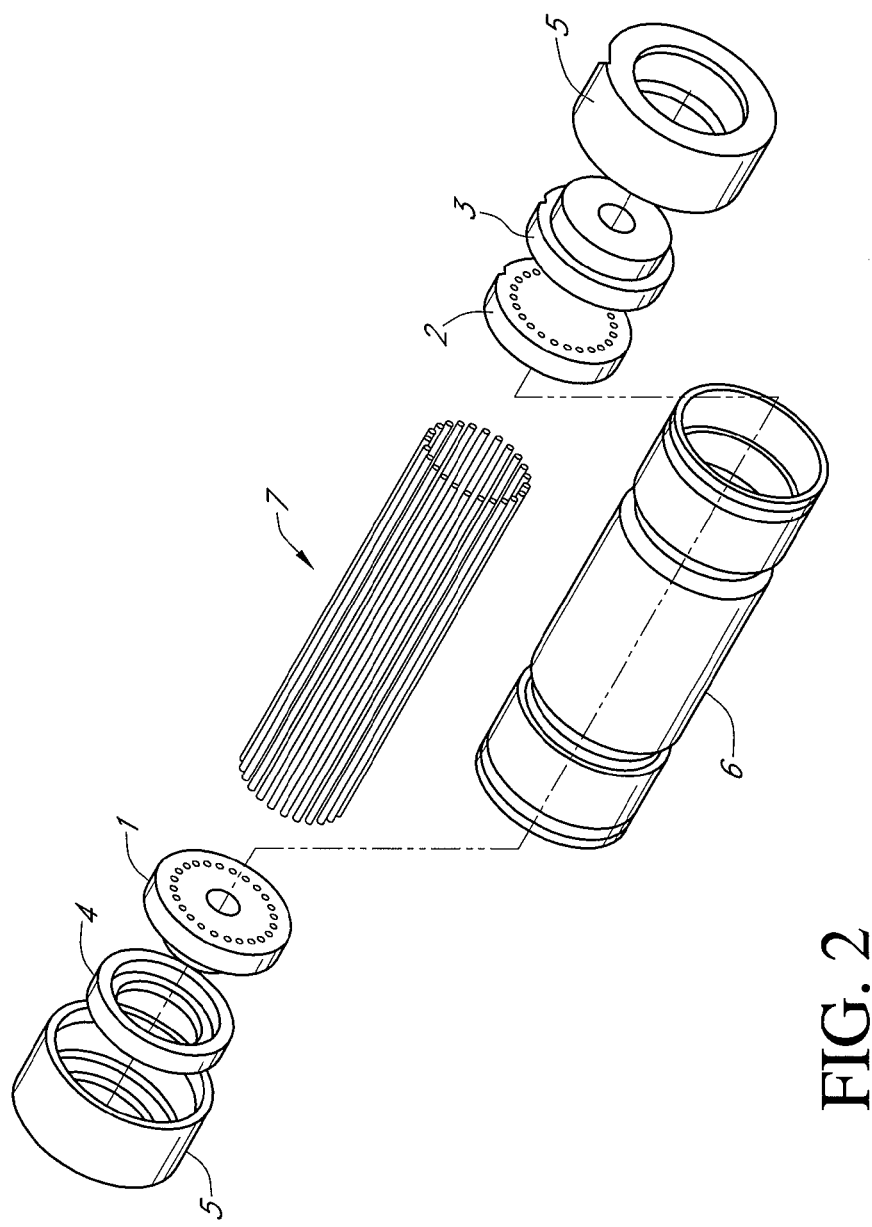
FIG. 2 depicts a seal of a preferred embodiment, including 24 lumens (7), a body enclosing the lumens (6), compression rings (5), an outlet fitting (4), an inlet fitting (3), a collector plate for the inlet configured to accept the 24 lumens (2), and a collector plate for the outlet configured to accept the 24 lumens (1).

A fluid connector is provided that allows for the simultaneous sealing of multiple tubes within a single outer shell when an external radial compressive force is applied. The devices and methods of the preferred embodiments allow for the connection of many individual small tubes to a larger common single tube. It specifically allows for the sealing of multiple lumens, thin wall tubular membranes, within a single plane sealant with a single externally generated force. It eliminates the need for welding or thermally bonding the multi-lumen assemblies together. The seals can be resealed if the radial force is removed and then reapplied. This allows for the removal and repair or replacement of one the lumens. Because the sealant can be an ultrapure, high temperature fluoropolymer, it can be used in where potting compound type sealants (e.g., epoxy sealants) will fail.

The connectors of preferred embodiments include three main components: the shell and external compressive force; the sealant; and the inner tube or lumens (with or without backing ferrules).

The shell can be any material suitable for use in an application of interest, for example, stainless tubing, copper or aluminum tubing, plastic tubing including PFA (a polymer of tetrafluoroethylene and perfluorovinylether), and other fluoropolymers. The radial force is preferably generated by a swaging operation which can be accomplished by compression of an external ferrule over the shell. Suitable ferrules or nuts can be obtained from Swagelok Companies (Solon, Ohio) or Plasmatech (El Monte, Calif.). A spring clamp or hose clamp (Oetiker, Marlette, Mich.) can be applied to the shell if the shell can deform sufficiently to allow for the transfer of radial compressive forces into the sealant and lumens. The compression can also be permanent, as can be achieved if the shell is made of non-elastic material that will retain its deformed shape after compression. Such non-elastic materials include metal shells made from a material such as stainless steel or aluminum. Additionally the force can be generated by pressing the shell over the sealant.

The shell is significantly stiffer than the sealant, preferably by a factor of at least 5 times.

The sealant is an elastic material that transfers forces between the shell and the lumens. The preferred material has a sufficiently low Young's Modulus to deform with minimal external force, but a sufficient Young's Modulus to withstand the external pressure against the seal. It is preferably isotropic, so as to produce uniform strain within the sealant. The ideal material is also noncompressible to allow for satisfactory strain transfer. It should also have good isostatic properties (like water) to generate satisfactory radial forces around each lumen. In addition, the material preferably has good plasticity characteristics. No material has all these characteristics, but elastic and plastic materials all have some of these characteristics and are suitable for use as sealants. The sealant material should be compatible with the operating conditions of the seal. Temperature, chemical environment, and mechanical stresses are considered when selecting a sealant. While KYNAR® polyvinylidene fluoride (PVDF), perfluoroalkoxy (PFA), Nylon, polytetrafluoroethylene (PTFE), fluorinated ethylene propylene (FEP), and DELRIN® acetal homopolymer were found to work satisfactorily in a single lumen seal, as more holes are added to the sealant plate the ability of the material to equalize stresses becomes more important. The high plastic and creep rates of PTFE make it the preferred choice for sealing multi-lumen assemblies. After being stressed beyond a certain minimum stress, the sealant undergoes a permanent plastic displacement of the molecules within the material. This allows the sealant to deform around each lumen with equalized radial forces. Any movement of the lumen later will be met by a movement of the sealant to fill the space or move away from excess loading. When the stress is released the sealant does not return to its original position, but only deforms enough to release the elastic strain. For plastic or amorphous materials, this movement is caused by polymer chains moving past one and other. Both ends of the sealant can be modified to allow for internal and external connections. In this design, one end of the sealant is open to allow for the insertion of the lumens. The other end is internal threaded to connect to the common supply or return. The outside the sealant can also be attached to the shell via either the external force or a different connection allow for a shell to be placed around the lumens. This provides a secondary containment to allow for pervaporation or heat transfer to take place with a secondary fluid stream.

The inner tube(s) can be any material stiff enough to form a seal with the sealant. This includes thick wall plastic tubing such as fluoropolymer tubing, stainless steel, copper, or aluminum tubing, or glass or quartz tubing. If the lumen has a very thin wall so that it cannot resist the radial compressive forces from the sealant to prevent leakage, an inner ferrule can be tightly fit within the lumen to provide rigidity to the lumen. The ferrule is preferably a material compatible with the process environment, such as thick wall plastic tubing including fluoropolymer tubing, stainless steel, copper, or aluminum tubing, glass or quartz tubing, ceramic, or carbon fiber.

The need for joining multiple small tubes to a larger common tube is generally needed for distribution piping, heat transfer, or mass transfer. Distribution piping from a common tube to multiple small tubes is needed for precision material analyzers where only small amounts are needed for testing such as liquid and gas chromatography. Heat exchangers and contactors used for pervaporation and degassing require very high surface to area ratios to increase the contact area between two separate fluids. This is most efficiently accomplished by reducing the diameter of the internal tubes and increasing the number of internal tubes. The only drawback is the number and difficulty of forming the radial seal that is needed at the end of each tubing bundle.

Fuel cells can be built from tubular assemblies with inherent benefits for structural integrity, ingress and egress, and cost. The seals of preferred embodiments allow for multiple fuel cells or hydrogen generator cells to be sealed at once. This allows for flow of water, air, oxygen, hydrogen, and electrical conductors to be connected in one seal.

The seal allows for sealing small thin tubing with internal diameters as small as 0.005" or less and with walls are thin as 0.0005" or less into larger bundled assemblies without the use of potting compounds or thermal bonds. The preferred range of lumen diameters is from about 0.001" diameter or less to about 0.50" diameter or more. Most preferably, the tubing has an outer diameter of from about 0.009" to about 0.187".

Lumens can be dispersed uniformly throughout the sealant if the lumens have sufficient Young's modulus and a wall thickness sufficient to prevent significant deformation of the lumen during compression of the sealant. This can be achieved by using structurally rigid lumens or backing the lumens with a rigid material. Lumens can be dispersed be equally in a circular pattern about the center line of the sealant if the lumens have a Young's Modulus comparable to the Young's Modulus of the sealant. Depending on the specific number of lumens and diameter of the sealant, one, two, three, or more circles of holes can be concentrically located about the centerline. The seal is generated by an external radial compressive force. The removal of the force partially releases the clamping force on the individual lumens allowing for the removal and repair or replacement of the tube. Any suitable number of lumens can be employed, e.g., from 1 2 to about 100 or more, preferably from about 2, 3, 4, 5, 6, 7, 8, 9, or 10 to about 15, 25, 30, 35, 40, 45, 50, 60, 70, 80, or 90. Preferably, the cross-sectional area of the seal taken up by lumens is less than 50%, more preferably less than 40%, more preferably still less than 30%, and most preferably less than 20%; however, in certain embodiments, it can be desirable for the lumens to take up 50% or more of the cross sectional area of the seal.

The ability to replace potting compounds (e.g., epoxies) which release contaminants with cleaner more stable materials (such as PTFE) allows the materials to work in corrosive, acid, and higher temperature environments. Seals of the preferred embodiments work at temperatures over 250° F., whereas potting compounds typically fail when used in humid or steam conditions.

The ability of the sealant to form a hermetic union between a common fluid connection and multiple lumens, and the ease of use of the connector for both internal flow distribution and external shell connection, makes it useful in the fabrication of heat exchangers and contactors for both heat and mass transfer fluid processing.

Single lumen assemblies can be conventionally assembled through a number of methods including hose barbs, Luer Fittings, and swaging connection with or without a backing ring. These techniques are only practical for a small number of connections, since the space, labor, and leak probability all increase significantly with each additional parallel connection.

The following are definitions for joining multiple tubes to a single outer tube. For purposes of clarity, the inner tubes are referred to as lumens, and the outer tube that surrounds the lumens is referred to as the shell. The material between the lumens and the shell is the sealant. It requires a lumen, a shell, and a sealant to make a seal.

When thermoplastic multiple lumens need to be joined to build a multi-lumen assembly, three alternate assembly techniques are applied. The first is the most crude and least used in production products. In this technique, multiple single seal connections are mechanically fastened into a larger common header. The individual lumens are then attached one by one. The advantage of this technique is the ability to repair or replace a damaged lumen. The drawbacks include the high cost of labor to assemble and test each fitting and the space needed between individual lumens to make or break each fitting. Other common techniques used with thermoplastics (as well as metals) include formation of a thermal bond, where a thermoplastic material of a similar composition but lower melt temperature is heated to allow the bulk plastic to flow around all the lumens to form a hermitic seal. The lower melting material is the sealant. The sealant and lumen must have temperatures close enough so that a good penetrating bond takes place into both materials, but be low enough to not allow the lumens to completely melt which will cause them to collapse. These types of products are commonly used in semiconductor industry for high surface area contactors sold by Pall, Mykrolis, and Membrana. While the thermoplastic bonding is a preferred approach to joining multiple lumens, in some situations, such as material incompatibility or temperature sensitivity of the lumen, thermoplastic bonding may not be a suitable method. In addition, melting of thermoplastics requires high temperatures and can release toxic fumes during the melt process, so safety can be an issue.

Another common method for assembly is by use of a potting compound such as epoxy or urethane. The potting compound acts as the sealant between the lumens and shell. The potting compound resists pressure differences by adhesion between the lumen and the potting material and the external shell. This seal resists external pressure differentials via shear stress created by the adhesion between the lumens, sealant, and shell. This method is commonly used in medical, fuel cell, and analytical applications. The drawback is that the potting compound is a different material that will have different corrosion, pressure, environmental, and thermal expansion characteristics that can lead to reduced performance and marketability. Membranes function in a wide range of environmental conditions, including osmotic pressure and humidity. When sealing to lumens made from fluoroionomers that can swell over 50% in high temperature and high humidity conditions, potting compounds separate from the lumens and shells. This prevents their use in certain high temperature applications for multi-lumen assemblies such as steam purification or humidification in high temperature fuel cells.

The connectors of preferred embodiments allow for joining of multi-lumen assemblies without the use of thermoplastic bonding with heat or assembly with potting compounds. While this method is particularly suitable for the assembly of perfluoropolymer tubular membranes made from NAFION®, this approach can be applied to assembly of any tubular bundle.

The connectors of preferred embodiments are useful in fuel cell applications, steam generation, electrode deionization, dialysis, and other applications as disclosed herein.

Membrane Lumens for Steam Generation

In one embodiment, the connector is used in steam generation, wherein the steam feed is purified by passing the feed through a substantially gas-impermeable ionic exchange membrane in the form of a lumen. The term "substantially gas-impermeable membrane" as used herein is a broad term and is used in its ordinary sense, including, without limitation to refer to a membrane that is permeable to water vapor but relatively impermeable to other gases such as, but not limited to, hydrogen, nitrogen, oxygen, carbon monoxide, carbon dioxide, hydrogen sulfide, hydrocarbons (e.g., ethylene), volatile acids and bases, refractory compounds, and other volatile organic compounds. Gas impermeability can be determined by the "leak rate" of the membrane. The term "leak rate" as used herein is a broad term and is used in its ordinary sense, including, without limitation to refer to the volume of a particular gas that penetrates the membrane surface area per unit of time. For example, a substantially gas-impermeable membrane has a low leak rate of gases other than water vapor, such as a leak rate of less than about $10^{-3}$ $cm^3/cm^2/s$ under standard atmosphere and pressure. Alternatively, a "substantially gas-impermeable" membrane can be identified by a ratio of the permeability of water vapor compared to the permeability of other gases. Preferably, the substantially gas-impermeable membrane is more permeable to water vapor than to other gases by a ratio of at least about 10,000:1, such as a ratio of at least about 20,000:1, 30,000:1, 40,000:1, 50,000:1, 60,000:1, 70,000:1, 80,000:1, 90,000:1 or a ratio of at least about 100,000:1, 200,000:1, 300,000:1, 400,000:1, 500,000:1, 600,000:1, 700,000:1, 800,000:1, 900,000:1 or even a ratio of at least about 1,000,000:1. However, in other embodiments, other ratios greater than 1:1 are acceptable, for example, 1.5:1, 2:1, 3:1, 4:1, 5:1, 6:1, 7:1, 8:1, 9:1, 10:1; 50:1, 100:1, 500:1, 1,000:1, or 5,000:1 or more.

The term "ion exchange membrane" as used herein is a broad term and is used in its ordinary sense, including, without limitation to refer to a membrane comprising chemical groups capable of combining with ions or exchanging ions between the membrane and an external substance. Such chemical groups include, but are not limited to, sulfonic acid, carboxylic acid, phosphoric acid, phosphinic acid, arsenic groups, selenic groups, phenols, and salts thereof. The chemical groups can be in a salt form or an acid form where the cations or protons are exchangeable with other cations from an external source, e.g., a solution or gas. Ion exchange membranes can be provided in acid form and converted to salt forms by pretreating the membrane with a base, such as an alkali metal base, e.g., sodium hydroxide, potassium hydroxide, sodium carbonate, sodium hydrogen carbonate, potassium carbonate or potassium hydrogen carbonate lithium hydroxide, or an alkaline earth metal bases, e.g., calcium hydroxide, calcium oxide, magnesium hydroxide or magnesium carbonate.

In one embodiment, the ion exchange membrane is a resin, such as a polymer containing exchangeable ions. Preferably, the ion exchange membrane is a fluorine-containing polymer, e.g., polyvinylidenefluoride, polytetrafluoroethylene (PTFE), ethylene tetrafluoride-propylene hexafluoride copolymers (FEP), ethylene tetrafluoride-perfluoroalkoxy-ethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluoride-propylene rubber, and fluorinated thermoplastic elastomers. Alternatively, the resin comprises a composite or a mixture of polymers, or a mixture of polymers and other components, to provide a contiguous membrane material. In certain embodiments, the membrane material can comprise two or more layers. The different layers can have the same or different properties, e.g., chemical composition, porosity, permeability, thickness, and the like. In certain embodiments, it can also be desirable to employ a layer, e.g., a membrane, that provides support to the filtration membrane, or possesses some other desirable property.

The ion exchange membrane is preferably a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the tradenames NAFION® (E.I. du Pont de Nemours & Company), FLEMION® (Asahi Glass Company, Ltd.), and ACIPLEX® (Asahi Chemical Industry Company).

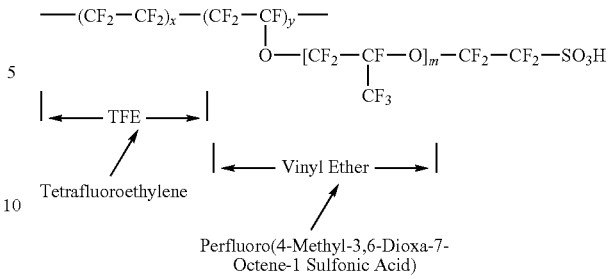

PFSA-TFE Copolymer in the Hydrolyzed Sulfonic Acid Form

A PFSA-TFE copolymer contains a tetrafluoroethylene (TFE) "backbone," to which perfluorosulfonic acid (perfluoro(4-methyl-3,6-dioxa-7-octene-1-sulfonic acid)) groups are attached. There can be one, two, three, four, five, or six perfluorosulfonic acid groups for every six TFE backbone units. Any suitable molecular weight polymer can be employed. Preferably a molecular weight from about 500 MW or less to about 2000 MW or more or more is employed. The molecular weight can also be from about 600, 700, 800, or 900 MW to about 1000, 1100, 1200, 1300, 1400, 1500, 1600, 1700, 1800, or 1900 MW. The molecular weight can even be from about 910, 920, 930, 940, 950, 960, 970, 980, or 990 MW to about 1000, 1010, 1020, 1030, 1040, 1050, 1060, 1070, 1080 or 1090 MW. A single copolymer can be employed, or combinations of two or more different copolymers (e.g., varying in chemical composition, molecular weight, or other property) can be employed. A copolymer having a single peak molecular weight is generally preferred; however, in certain embodiments it can be preferred to employ a polymer with a bimodal or multimodal molecular weight distribution, with varying amounts of polymer chains having different molecular weights. The copolymers may be in any configuration, e.g., block, tapered, random, linear, branched, and/or crosslinked. Chemical structures and properties of several different perfluorinated ionomers are described in References 1 and 2 included in the Appendix.

$$—(CF_2—CF_2)_x—(CF_2—CF)_y—$$
$$\quad\quad\quad\quad\quad\quad\quad | $$
$$\quad\quad\quad\quad\quad\quad O—[CF_2—CF—O]_m—CF_2—CF_2—CO_2H$$
$$\quad\quad\quad\quad\quad\quad\quad\quad\quad\quad | $$
$$\quad\quad\quad\quad\quad\quad\quad\quad\quad\quad CF_3$$

|← TFE →|    |← Vinyl Ether →|

Tetrafluoroethylene    Perfluoro(4-Methyl-3,6-Dioxa-7-Octene-1 Carboxylic Acid)

Chemical Structure of a PFCA-TFE Copolymer in the Hydrolyzed Carboxylic Acid Form PFCA-TFE copolymers contain a tetrafluoroethylene (TFE) "backbone," to which the perfluorocarboxylic acid (perfluoro(4-methyl-3,6-dioxa-7-octene-1-carboxylic acid)) groups are attached. PFSA-TFE copolymers and PFCA-TFE copolymers can be converted to the salt form by pretreatment with a suitable base, such as an alkali metal base (e.g., as described above). Such pretreatment processes of ion exchange membranes are well known in the art and can be performed, for example, in accordance with the manufacturer's recommendations. Depending upon the nature of the steam feed (e.g., impurities, impurity levels) and the resulting purified steam to be generated, the pretreatment conditions can be adjusted to yield an optimized membrane. For example, the selection of base, solvents used, temperature, exposure time, rinse conditions, extent of ion exchange (e.g., 10% or less to 90% or more) can be adjusted. It can also be desirable to adjust the hydrophilicity of the resulting membrane by crosslinking it with a hydrophilic agent, or co-casting the polymer with a hydrophilic component. In such embodiments, the polymer already includes crosslinkable groups, or is functionalized to include crosslinkable groups. Other forms of pretreatment can also be employed (e.g., reaction with agents to modify the surface morphology of the polymer (roughen, increase or decrease porosity, etc.), without modifying the surface chemistry.

Preferably, the membrane is a substantially gas-impermeable perfluorinated ionomer, e.g., a NAFION® membrane, wherein the permeability of water vapor is greater than three orders of magnitude larger than the permeability of $CO_2$ or CO, and approximately six orders of magnitude greater than the permeability of oxygen or nitrogen.

Hydrogen diffusion can be effectively suppressed through a NAFION® membrane, while permitting passage of water vapor. The substantially gas-impermeable membrane is preferably substantially nonporous. The substantially gas impermeable membranes can suppress the diffusion of gases and other materials, such as particles, aerosols, viruses, bacteria, prions, metals, ions, and other airborne molecular contaminants.

In preparing ultrapure steam, a steam feed is passed through the membrane. The term "passing a steam feed through a membrane" is a broad term and is used in its ordinary sense, including, without limitation to contacting a first side of a membrane with the steam feed, such that water molecules pass through the membrane, and obtaining a purified steam on the opposite side of the membrane. The first and second sides can have tubular or cylindrical form where one surface forms the inner portion of the tube and an opposing surface lies on the inner surface. Depending upon the processing conditions, nature of the feed stream, volume of steam to be generated, and other factors, the properties of the membrane can be adjusted. It is generally preferred that the membrane be from about 0.5 microns in thickness or less to 2000 microns in thickness or more, preferably about 1, 5, 10, 25, 50, 100, 200, 300, 400, or 500 microns to about 600, 700, 800, 900, 1000, 1100, 1200, 1300, 1400, 1500, 1600, 1700, 1800 or 1900 microns. When thinner membranes are employed, it can be desirable to provide mechanical support to the membrane (e.g., by employing a supporting membrane, a screen or mesh, or other supporting structure), whereas thicker membranes can be employed without a support. The surface area of the membrane can be selected based on the mass of purified steam to be produced. Generally, to provide 1 kilogram/minute of steam at a pressure of 126 KPa and a temperature of 106° C., it is desirable to employ a membrane of the preferred embodiments at least 8.85 m² of surface area. However, depending upon the chemistry of the membrane, higher or lower surface areas can be desirable. It is generally desirable to provide from about 0.1, 0.2, 0.3, 0.4, 0.5, 0.6, 0.7, 0.8, 0.9, 1, 2, 3, 4, 5, 6, 7, 8, 9 or 10 kg/min of steam up to about 20, 30, 40, 50, 60, 70, 80, 90, or 100 kg/min or more; however, in certain embodiments it can be desirable to provide to provide steam in lower or higher amounts. Steam of any suitable temperature can be provided, preferably from about 100° C. or less to about 101, 102, 103, 104, 105, 106, 107, 108, 109, 110, 120, 150, 200, 250, or 300° C. or more. Suitable membrane surface areas are generally from about 0.01 m² or less to about 0.1, 1, 10, 20, 30, 40, 50, 60, 70, 80, 90, 100, 200, 300, 400, 500, 600, 700, 800, 900, or 1000 m² or more.

Membranes in fiber form offer the ability to provide greater exposed membrane surface area in a fixed volume. Preferably, the membranes comprise hollow fibers, the fibers being fixed at each end in a header using a connector of a preferred embodiment. The fibers are normally sealed at the lower end and open at their upper end to allow removal of purified steam; however, in some arrangements, the fibers can be open at both ends to allow removal of purified steam from one or both ends. Alternatively, steam feed can be provided to the interior of the membrane fibers, and purified steam removed from a space surrounding the exterior of the fibers.

Connectors

NAFION® is perfluoropolymer that also contains sulfonic groups that are modified during a hydrolysis process to give it the ionic characteristic that make it an excellent material for use in separating positive ions from negative ions such as is used in dialysis membranes, chloralkali cells, fuel cells, and hydrogen generators. However, once the membrane has been hydrolyzed (converted from the precursor to the acid form) bonding it to other materials is very difficult. It requires drying the material out and hot pressing between two plates under temperature and pressure. U.S. Pat. Nos. 4,954,206, 5,746,856, and 4,990,296 each disclose fluoropolymer welding methods. Each of these techniques addresses flat surface bonds but does not address joining tubular bundles. U.S. Pat. Nos. 5,458,989 and 6,007,932 disclose use of multilumen assemblies; however, they use individual mechanical connections to join the lumens.

Attempts have been made to bond NAFION® in either the hydrolyzed or precursor state to both itself and other fluoropolymers such as FEP, KYNAR®, and PFA, all such bonds failed after cycling to steam and high pressure and then cycling back to dry ambient conditions.

To overcome this sealing challenge, thermal bonding methods are not desirable. Use of potting materials is also not desirable when the intended use is in ultrapure environments or under high temperature and humidity, such as supersaturated steam conditions. Swaging technology for process piping connections is well known. Manufacturers such as Swagelok (Solon, Ohio) and Plasmatech (El Monte, Calif.) have provided fittings to make single tube to tube hermetic seals for many years. For very soft tubes, a backing ferrule is commonly used as an insert within the tube. In cases where one or more of the tubes has a very thin wall, there is no common industry solution for joining multiple lumens other than the conventional methods mentioned above.

For a multilumen connection for NAFION® tubing under saturated steam conditions, TEFLON® was used as a sealant between the NAFION® tubing and the external shell. The NAFION® lumen utilized an internal insert for support. The sealant was PTFE. An externally generated radial compressive force was used to compress the shell into the sealant and generate radial compressive forces around each of the internal lumens. The PTFE sealant allows for the rapid distribution of internal stresses generated during to compression to prevent stress risers and variable elastic conditions. When applying an external force to any solid material, the material will creep or cold flow. The material moves to relax and equalize forces exerted on the material. While for most material this effect is insignificant, for polytetrafluoroethylene (TEFLON®), the effect is significant and almost immediate. At room temperature, PTFE will change shape when pressure is applied. PTFE is not generally used for seals without an additional elastic component due to this property of cold flow, which is viewed as undesirable (see, e.g., U.S. Pat. No. 6,153,083). However, in the preferred embodiments, this property of cold flow is beneficial. In most cases, if a cylindrical polymer is provided with a series of holes, and an external radial stress is applied, isostatic pressure will not be applied to the through holes. However, if the material is made from PTFE, the cylinder will cold flow rapidly to generate isostatic forces on all surfaces of the through hole.

Perfluoroalkoxy (PFA) has the same corrosion resistance as PTFE. By backing the lumens with a short piece of PFA tube inserted into the ends of each tube, and then sliding the assembly into the holes in the disc, a multilumen sealing assembly can be constructed. If a radial force is exerted, typically through a swaging operation, then all the lumens will be sealed simultaneously.

A system of a preferred embodiment was first tested on a single lumen. The 0.125" diameter lumen assembly was inserted into a 0.375" diameter Teflon cylinder with a 0.140" diameter thru hole. The assembly was then compressed with a Plasmatech ⅜" diameter radial compression fitting. The fitting was repeatedly cycled to 1500 Torr (29 psia at 250° F. with a continuous steam flow and then allowed to cool back to atmospheric temperature and pressure. All previous bonds failed under this condition, but this system maintained a seal.

This technique was then applied to a triple lumen assembly. Two assemblies were built to be tested on steam generators. ½" Diameter TEFLON® rod was cut 0.75" long and had three 0.140" diameter thru holes bored equally spaced on a 0.4" bolt circle through them radially along the axis of the cylinder. They were loaded into a steam purifier assembly. The purifier was cycled repeatedly to 900 Torr and back over a dozen times. After cycle testing for a week, they were run continuously without any sign of failure for 646 hours and 444 hours, respectively. Neither assembly had membrane or seal failure since beginning testing. Tests were changed from continuous to daily to increase thermal cycling without noticeable effect. Results are presented in FIG. 1.

A seven lumen assembly was created based on hexagonal dense packing with 0.14" diameter holes on 0.2" center to center spacing. The seal was tested to 80 psig nitrogen without failure. The seal was then cycled up to 1200 torr without any leakage or failure. Pressure was limited due to test setup. The system ran intermittently without failure of membrane or seal.

An additional test was run. In this test a two inch diameter PTFE disc 0.75" thick was used as the sealant. An outer ring of 24 equally spaced 0.140" diameter holes were drilled and an inner ring of 18 equally spaced 0.140" were also drilled for a total of 42 holes. A 0.135" diameter lumen with PFA ferule was inserted each hole. A 1.87" internal diameter stainless steel ring was place over the assembly. Nitrogen pressure of 75 psig was applied on one end of the seal. No leaks were seen on the opposite side using bubble testing . . . .

An additional steam pressure test was run. A 2" diameter PTFE disc was drilled out with at ring of 24 equally spaced 0.140" holes. 24 0.135 diameter lumens with PFA ferrules were inserted into the disc. An additional PTFE adapter with a 2.0" inner diameter and 2.5" outer diameter was placed over the disc. A stainless steel compression ring was then press over the entire assembly of adapter, disc, and lumens. The connector was then operated at steam pressure and temperature of 1200 torr. The unit was then removed and tested at 10 psig. No bubbles were detected.

To better understand the characteristics of the connectors of preferred embodiments, several finite element analyses were conducted (see Experiments #1 and #2). A seven lumen assembly was tested using both stainless steel and PFA back ferrules. The sealant was first analyzed for PFA and then for polypropylene.

The studies verified the basic sealing principle of hard-soft-hard employed in the connectors is effective, the first hard portion being the member generating the compressive radial force, the soft portion beings the sealant (also referred to as the sieve plate) which deform sufficiently to transfer energy through the plate into the lumen, and the second hard portion being the internal ferrule placed within each lumen.

The sieve plate can be fabricated from any material that has low compressibility and low modulus elasticity. Plastics are particularly preferred. Data was modeled for both PTFE and polypropylene, and previous mechanical tests demonstrated that nylon, DELRIN®, KYNAR®, and PTFE are each effective at pressures up to about 100 psig.

The stainless steel ferrules provide a very hard surface which provides a good sealing force to all the lumens. When a softer material, e.g. PFA, is used inside the lumens the sealing force is greatly reduced as the PFA deforms, reducing the sealing force available between the lumens and the sieve plate.

Each lumen can be viewed as an air pocket within the sieve plate. If the air pocket is protected by a rigid sleeve, it does not deflate and the pressure is transferred radially inward. If the air pocket has only a soft sleeve the external radial force causes it to collapse, preventing the radial force from moving inward to the next row of holes. They act similar to a crumple zone on a car, which absorbs the energy so it cannot pass through the zone.

Ferrule materials preferably have an optimum combination of high hardness balanced by material compatibility and contamination. Preferred materials include copper, stainless steel and related alloys, rigid plastics, quartz, glass, ceramic, and carbon fibers and combinations of the above.

Results of the first finite element analysis (Experiment #1) focused on a two ring system with one hole surrounded by six holes. The analysis indicated that for PTFE sealant, when using rigid ferrules, radial compression transferred more evenly between center and outer ring. When using soft ferrules, radial compression fell off sharply from outer to inner rings, suggesting diminished compressive force the farther from the source of applied radial compression. For a polypropylene sealant, when using rigid ferrules, higher compression was seen on the outer holes. The stiffer sealant did not cold flow sufficiently to equalize radial stresses.

The results from the second finite element analysis (Experiment #2) were less clear. A third and fourth outer ring were added to generate a model for a 19 and 37 whole system. Use with stainless steel ferrules did not match previous results, so model did not verify a seal with additional concentric rings of holes. When used with PFA ferrules, four concentric rings could be simultaneously sealed. Removal of the inner rings generated more equal sealing force implying diminished compressive force the farther from the source of applied radial compression. It is believed that these results do not take into account the high creep tendencies of PTFE to equalize internal stresses.

A radial seal generates radial compression around each and every lumen. A potting seal forms a barrier between the lumen and the shell. It resists pressure differences by adhesion between the lumen and the potting material and the external shell. This seal resists external pressure differentials via shear stress created by the adhesion between the lumens, sealant, and shell. Adhesion strength is generally lower being a function of the material surface properties of the seal where as radial stresses can be increased with external forces that are not limited to surface material characteristics.

Experiments #1 and #2 are described below, and in the attachments.

Experiment #1

The objective of the first experiment was to determine the sealing pressure on the inside of a TEFLON® (PTFE) or polypropylene fitting. The fitting splits fluid flow in a larger tube into a series of seven smaller tubes as part of a steam purification process. A performance issue with the fitting is the sealing at the smaller, inner tubes' interfaces. This seal is achieved by swaging the outer diameter (OD) of the fitting so that the inner tubes are crimped with enough radial pressure such that a good seal is maintained, without substantially restricting flow through the lumen.

The finite element method used represented a 30° section of the fitting. Symmetric boundary conditions were applied to the bounding radial planes to simulate the entire 360°. Solid elements were used to represent the TEFLON® fitting and NAFION® membrane while the inner stainless steel tube or PFA (perfluoroalkoxy) tube was modeled with shell elements (not shown in Figure in attachment for Experiment #1). The solution was performed in multiple steps. First the fitting was swaged 15% (0.05625" radially). The swaged section was rigidly held in place while the entire model was temperature cycled from 73° F. to 253° F. and back to 73° F. Temperature dependent material properties for simulations of PTFE and polypropylene were also used. Results for the models are provided in Table 1.

ous configurations. The fitting and tube materials were as described above for Experiment #1.

The finite element method used represented a 30° section of the fitting. Symmetric boundary conditions were applied to the bounding radial planes to simulate the entire 360°. Solid elements were used for the entire model which allowed the TEFLON® to "flow" vertically with respect to the stainless steel inserts. The solution was performed in multiple steps. First, the fitting was swaged 15% (0.05625" radially). The swaged section was rigidly held in place while the entire model was temperature cycled from 73° F. to 253° F. and back to 73° F. (20° C.-120° C.-20° C.). The amount of swage was 0.05625" for all cases. Results for minimum sealing stress are provided in Table 2.

TABLE 2

| | Inner | Minimum Sealing Stress | | | | | |
|---|---|---|---|---|---|---|---|
| Case | Tube | Hole 1 | Hole 2 | Hole 3 | Hole 4 | Hole 5 | Hole 6 |
| 1 | SS | −1,479 | −302 | n/a | n/a | n/a | n/a |
| 2 | SS | −677 | −681 | −214 | 446 (−43) | n/a | n/a |
| 3 | SS | −267 | −233 | −185 | 6 | 606 | 1,164 |
| 4 | SS | n/a | 150 | −214 | −53 | 483 | 915 |
| 5 | SS | n/a | n/a | 146 | −226 | 25 | −9 |
| 1 | PFA | −303 | −369 | n/a | n/a | n/a | n/a |
| 2 | PFA | −677 | −350 | −109 | −253 | n/a | n/a |
| 3 | PFA | −699 | −626 | −373 | −319 | −78 | −115 |
| 4 | PFA | n/a | −604 | −382 | −319 | −30 | −106 |
| 5 | PFA | n/a | n/a | −404 | −388 | −295 | −300 |

In Table 2, stresses are listed in units of psi at the membrane to PTFE interface. Positive stresses are tensile and represent loss of seal. The data suggests that certain arrangements of holes can lead to non-homogeneous stiffness and hence stress

TABLE 1

| | Fitting | Inner Tube | Stress (psi) Fitting | Nafion | Insert | Sealing Stress Outer | Sealing Stress Center Tube |
|---|---|---|---|---|---|---|---|
| Baseline | PTFE | SS | 1,600 | 15,700 | 9,600 | −1,000 | −1,300 |
| Swaged Released | PTFE | SS | 1,600 | 11,300 | 13,100 | 200 | −900 |
| Polypropylene Fitting | Polypropolene | SS | 5,700 | 22,000 | 34,900 | −5,600 | −2,400 |
| PFA Insert | PTFE | PFA | 1,700 | 14,100 | 2,500 | −700 | −300 |

The baseline design showed a sealing pressure (radial stress at tube OD) which was much higher than applied fluid pressure, indicating good sealing performance. The superior sealing performance was contingent on mechanically maintaining the swaging radial strain or deformation. If the swaging radial strain or deformation is relaxed, the seal is lost. This observation suggests that the loss of swaging prestress due to creep could be a concern in certain embodiments. Polypropylene has mechanical properties that make it well suited for steam purification process applications. Given that it is less prone to creep, polypropylene can be a desirable material for long term sealing applications in certain applications where creep would otherwise be a concern. The data also show that stainless steel, by virtue of its higher stiffness, is a preferred option for lining the inner tubes of the fitting.

Experiment #2

The objective of the second experiment was to determine the sealing pressure on the inside of a TEFLON® (PTFE) or polypropylene fitting for different numbers of lumens of varidistribution. This is most acute for Case 3, where four holes lined up on one radial symmetric plane while only two holes lined up on the other radial symmetric plane. The stainless steel liner at the holes caused the one radial plane to be much stiffer than the other, thus attracting much higher radial stress. The lack of stiffness uniformity leads to a complex deflection field where tensile stresses were possible at the membrane interfaces. Tensile stresses lead to loss of seal. The use of PFA liners reduced the localized stiffness variations and hence the propensity for creating tensile stresses at the membrane interfaces. The data suggest that distributing the holes uniformly in a band close to the fitting OD can be preferred in certain embodiments (i.e., Case 5).

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A connector, the connector comprising:
   a shell and a means for applying an external compressive radial force by a swaging operation;
   at least two lumens; and
   a sealant having a cold flow property such that, in use, when an external compressive radial force is generated by the swaging operation, the force is transferred between the shell and the lumens to form a resealable seal by cold flow of the sealant, wherein means for applying an external compressive radial force by a swaging operation comprises compression of an external ferrule over the shell.

2. The connector of claim 1, wherein each lumen further comprises a backing ferrule.

3. The connector of claim 1, wherein each lumen further comprises a backing ferrule, and wherein the backing ferrule comprises a material selected from the group consisting of stainless steel, metal, ceramic, glass, and plastic.

4. The connector of claim 1, wherein each lumen is a hollow fiber.

5. The connector of claim 1, wherein each lumen comprises a material selected from the group consisting of metal, glass, quartz, plastic, and ceramic.

6. The connector of claim 1, wherein the sealant comprises a plastic.

7. The connector of claim 6, wherein the plastic comprises nylon.

8. The connector of claim 6, wherein the plastic comprises a fluoropolymer.

9. The connector of claim 8, wherein the fluoropolymer is selected from the group consisting of a polymer of tetrafluoroethylene and perfluorovinylether, polytetrafluoroethylene, fluorinated ethylene propylene copolymer, a modified fluoroalkoxy polymer, polyvinylidene fluoride, and a perfluoroalkoxy polymer.

10. The connector of claim 1, comprising a plurality of concentrically arrayed lumens.

11. The connector of claim 1, wherein the shell comprises a material selected from the group consisting of stainless steel, steel, aluminum, copper, and thermoset plastic.

12. The connector of claim 1, wherein each lumen is a thin tubular membrane having a wall thickness of from about 0.0001 inches to about 0.035 inches.

13. The connector of claim 1, wherein each lumen has a diameter of from about 0.003 inches to about 0.5 inches.

14. The connector of claim 1, configured to operate at a pressure of from about 1 torr to about 3000 psi.

15. The connector of claim 1, having a diameter of from about 0.25 inches to about 6 inches.

16. The connector of claim 1, comprising from 2 to 250 lumens.

17. The connector of claim 1, wherein the connector is a steam transfer connector.

18. The connector of claim 1, wherein the connector is a tube in shell heat exchanger.

19. The connector of claim 1, wherein the connector is a tube in shell humidifier.

20. The connector of claim 1, wherein the connector is a tube in shell gas contactor.

21. A connector, the connector comprising:
    a shell and a means for applying an external compressive radial force by a swaging operation;
    at least two lumens; and
    a sealant having a cold flow property such that, in use, when an external compressive radial force is generated by the swaging operation, the force is transferred between the shell and the lumens to form a resealable seal by cold flow of the sealant, wherein each lumen comprises a perfluorinated ionomer.

22. The connector of claim 21, wherein the perfluorinated ionomer is selected from the group consisting of perfluorosulfonic acid/tetraafluoroethylene copolymers and perfluorocarboxylic acid/tetrafluoroethylene copolymer.

23. The connector of claim 21, wherein each lumen further comprises a backing ferrule.

24. The connector of claim 21, wherein each lumen further comprises a backing ferrule, and wherein the backing ferrule comprises a material selected from the group consisting of stainless steel, metal, ceramic, glass, and plastic.

25. The connector of claim 21, wherein the sealant comprises a plastic.

26. The connector of claim 25, wherein the plastic comprises nylon.

27. The connector of claim 25, wherein the plastic comprises a fluoropolymer.

28. The connector of claim 27, wherein the fluoropolymer is selected from the group consisting of a polymer of tetrafluoroethylene and perfluorovinylether, polytetrafluoroethylene, fluorinated ethylene propylene copolymer, a modified fluoroalkoxy polymer, polyvinylidene fluoride, and a perfluoroalkoxy polymer.

29. The connector of claim 21, comprising a plurality of concentrically arrayed lumens.

30. The connector of claim 21, wherein the shell comprises a material selected from the group consisting of stainless steel, steel, aluminum, copper, and thermoset plastic.

31. The connector of claim 21, wherein each lumen is a thin tubular membrane having a wall thickness of from about 0.0001 inches to about 0.035 inches.

32. The connector of claim 21, wherein each lumen has a diameter of from about 0.003 inches to about 0.5 inches.

33. The connector of claim 21, configured to operate at a pressure of from about 1 torr to about 3000 psi.

34. The connector of claim 21, having a diameter of from about 0.25 inches to about 6 inches.

35. The connector of claim 21, comprising from 2 to 250 lumens.

36. The connector of claim 21, wherein the connector is a steam transfer connector.

37. The connector of claim 21, wherein the connector is a tube in shell heat exchanger.

38. The connector of claim 21, wherein the connector is a tube in shell humidifier.

39. The connector of claim 21, wherein the connector is a tube in shell gas contactor.

40. A connector, the connector comprising:
a shell and a means for applying an external compressive radial force by a swaging operation;
at least two lumens; and
a sealant having a cold flow property such that, in use, when an external compressive radial force is generated by the swaging operation, the force is transferred between the shell and the lumens to form a resealable seal by cold flow of the sealant, wherein the sealant comprises a plastic, wherein the plastic comprises acetal homopolymer.

* * * * *

UNITED STATES PATENT AND TRADEMARK OFFICE
CERTIFICATE OF CORRECTION

PATENT NO. : 7,625,015 B2
APPLICATION NO. : 12/198764
DATED : December 1, 2009
INVENTOR(S) : Spiegelman et al.

It is certified that error appears in the above-identified patent and that said Letters Patent is hereby corrected as shown below:

At Column 3, Line 67, change "comprises" to --comprise--.

At Column 4, Line 6, change "comprises" to --comprise--.

At Column 10, Line 2-12 (Approx.), change

" 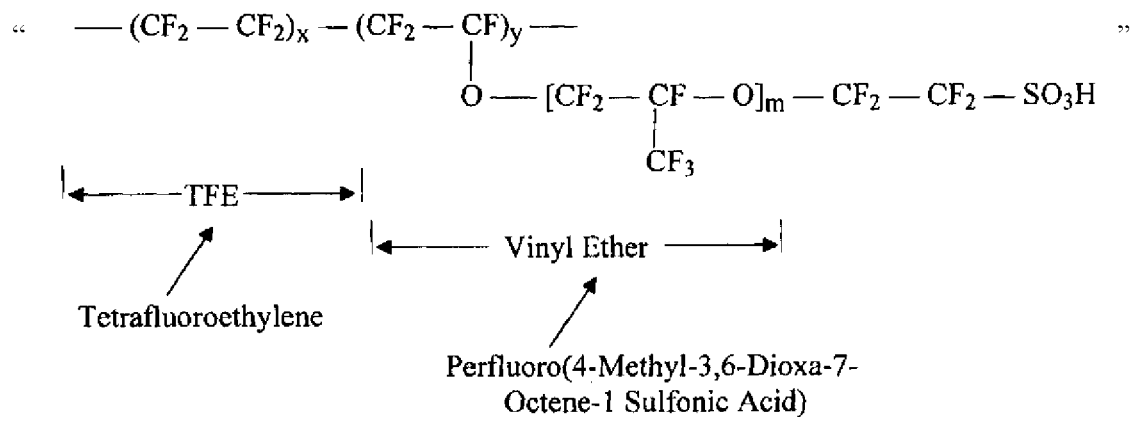 "

to

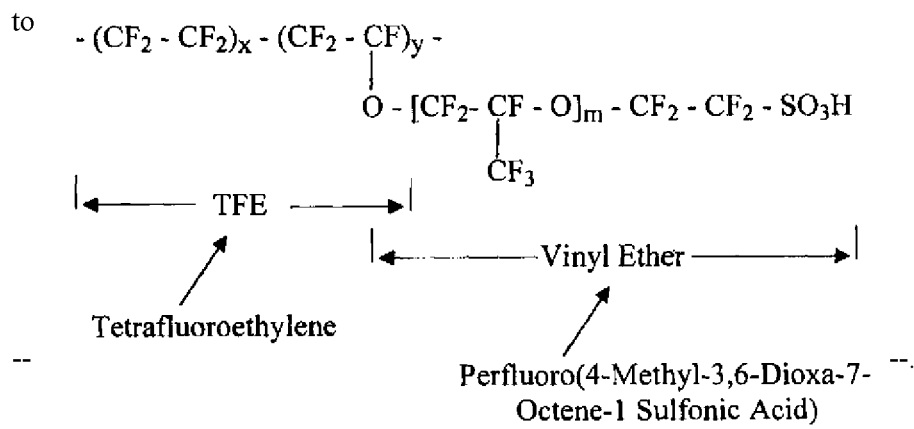 --.

Signed and Sealed this

Third Day of August, 2010

David J. Kappos
*Director of the United States Patent and Trademark Office*

CERTIFICATE OF CORRECTION (continued)
U.S. Pat. No. 7,625,015 B2

At Column 10, Line 46-57 (Approx.), change

"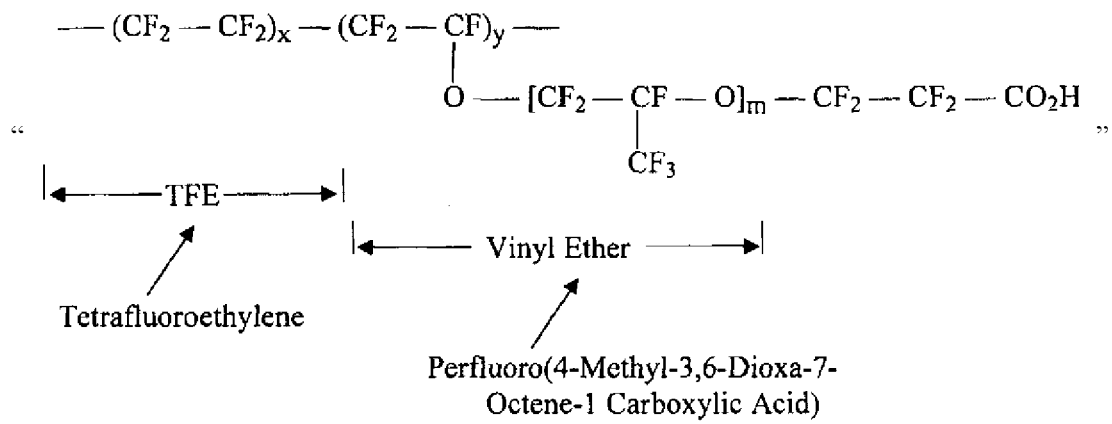"

to

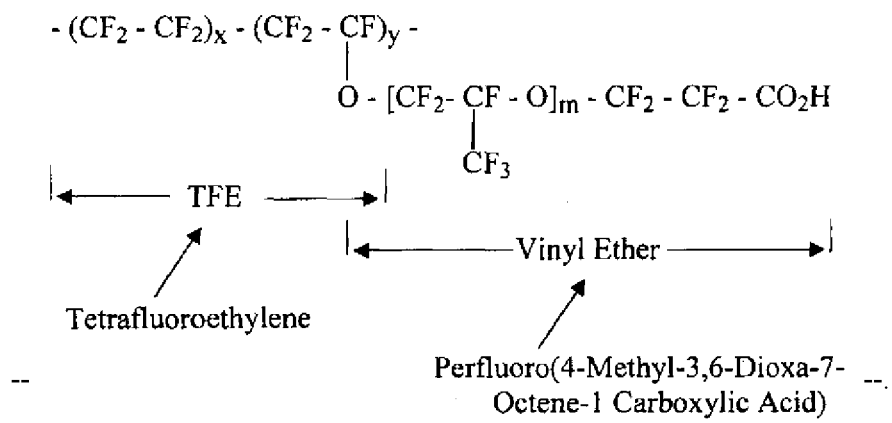

At Column 14, Line 24, change "e.g." to --e.g.,--.

At Column 18, Line 35, Claim 22, change "acid/tetraafluoroethylene" to --acid/tetrafluoroethylene--.